United States Patent
Lee et al.

(10) Patent No.: US 9,692,860 B2
(45) Date of Patent: Jun. 27, 2017

(54) ONE LAYER METAL TRACE STRAIN GAUGE

(71) Applicant: Apple Inc., Cupertino, CA (US)

(72) Inventors: Sungchang Lee, San Jose, CA (US); Ki Myung Lee, Cupertino, CA (US); Kee Suk Ryu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 14/278,262

(22) Filed: May 15, 2014

(65) Prior Publication Data

US 2015/0332574 A1    Nov. 19, 2015

(51) Int. Cl.
*H04M 1/02*    (2006.01)
*H04M 1/725*    (2006.01)

(52) U.S. Cl.
CPC ...... *H04M 1/0202* (2013.01); *H04M 1/72569* (2013.01)

(58) Field of Classification Search
CPC ..... G08B 21/18; G08B 7/06; H04M 2250/22; H04M 1/72533; H04M 1/0202; H04M 1/72569; G06F 3/016; G06F 3/16; G06F 17/00

See application file for complete search history.

(56) References Cited

U.S. PATENT DOCUMENTS

| | | | | |
|---|---|---|---|---|
| 6,717,520 B1* | 4/2004 | Dorenbosch | ........... | G04C 10/04 340/636.1 |
| 2004/0066300 A1* | 4/2004 | Dorenbosch | ........... | G04C 10/04 340/636.1 |
| 2004/0070499 A1* | 4/2004 | Sawinski | ........... | G08B 13/1409 340/568.1 |
| 2004/0135698 A1* | 7/2004 | Webb | ........... | G08B 21/10 340/690 |
| 2006/0103762 A1* | 5/2006 | Ly | ........... | H04N 1/00307 348/584 |
| 2008/0118091 A1* | 5/2008 | Serfaty | ........... | H04M 1/03 381/162 |
| 2008/0165022 A1* | 7/2008 | Herz | ........... | G06F 3/017 340/669 |
| 2010/0289740 A1* | 11/2010 | Kim | ........... | G04G 21/04 345/157 |
| 2011/0037712 A1* | 2/2011 | Kim | ........... | H04M 1/7253 345/173 |
| 2011/0064251 A1* | 3/2011 | Siotis | ........... | H04R 1/2834 381/191 |
| 2011/0065321 A1* | 3/2011 | Wang | ........... | H01R 31/005 439/620.01 |
| 2012/0029841 A1* | 2/2012 | Weber | ........... | G01P 15/0891 702/41 |

(Continued)

*Primary Examiner* — Orlando Bousono
(74) *Attorney, Agent, or Firm* — Michael H. Lyons

(57) ABSTRACT

A portable electronic device having a detection device is used to alert a user when the portable electronic device in undergoing a strain or deformation which could damage the portable electronic device. The alert includes an audible sound and/or a vibration event which signal to the user to remove the strain or deformation from the portable electronic device. The detection device may include a strain gauge attached to an enclosure of the portable electronic device. The strain gauge may output a change in electrical resistance in response to strain or deformation on the enclosure.

18 Claims, 7 Drawing Sheets

(56) References Cited

U.S. PATENT DOCUMENTS

| | | | |
|---|---|---|---|
| 2012/0051025 A1* | 3/2012 | Jol | G06F 1/1626 361/818 |
| 2012/0194976 A1* | 8/2012 | Golko | G06F 1/163 361/679.01 |
| 2013/0051601 A1* | 2/2013 | Hill | H04R 1/06 381/365 |
| 2013/0101140 A1* | 4/2013 | Cho | H03G 3/3005 381/109 |
| 2013/0147728 A1* | 6/2013 | Lee | G06F 3/041 345/173 |
| 2013/0231762 A1* | 9/2013 | Cho | H04M 1/72533 700/94 |
| 2013/0231764 A1* | 9/2013 | Cho | H04M 1/72533 700/94 |
| 2013/0232282 A1* | 9/2013 | Kim | H04M 1/72533 710/21 |
| 2013/0232443 A1* | 9/2013 | Ryu | H04M 1/72583 715/784 |
| 2013/0300732 A1* | 11/2013 | Hosoya | G06F 1/1652 345/419 |
| 2013/0321373 A1* | 12/2013 | Yoshizumi | G09G 5/00 345/211 |
| 2014/0062682 A1* | 3/2014 | Birnbaum | G08B 6/00 340/407.2 |
| 2014/0086440 A1* | 3/2014 | Holmberg | H04R 25/305 381/315 |
| 2014/0098095 A1* | 4/2014 | Lee | G06F 3/041 345/420 |
| 2014/0195027 A1* | 7/2014 | Cho | H04M 1/72533 700/94 |
| 2014/0218183 A1* | 8/2014 | Van Schyndel | G06F 3/016 340/407.1 |
| 2014/0232534 A1* | 8/2014 | Birnbaum | G06F 3/016 340/407.1 |
| 2014/0240264 A1* | 8/2014 | Im | G06F 1/1652 345/173 |
| 2014/0267100 A1* | 9/2014 | Sohn | G06F 3/0416 345/173 |
| 2014/0274214 A1* | 9/2014 | Kim | H04M 1/0266 455/566 |
| 2014/0274217 A1* | 9/2014 | Lee | H04M 1/0266 455/566 |
| 2014/0285452 A1* | 9/2014 | Park | G06F 3/041 345/173 |
| 2014/0298271 A1* | 10/2014 | Jakubiak | G06F 3/04883 715/856 |
| 2014/0315605 A1* | 10/2014 | Cho | H04M 1/035 455/575.1 |
| 2014/0323049 A1* | 10/2014 | Park | H04W 4/008 455/41.2 |
| 2014/0354852 A1* | 12/2014 | Won | H04N 5/2628 348/239 |
| 2015/0026638 A1* | 1/2015 | Kim | G06F 3/016 715/810 |

* cited by examiner

ONE LAYER METAL TRACE STRAIN GAUGE

FIELD

The described embodiments relate generally to an indication system in a portable electronic device. In particular, the present embodiments relate to an alert mechanism or warning when the portable electronic device is undergoing a deformation event in order to notify a user to remove the deformation event to prevent damage to the portable electronic device.

BACKGROUND

Portable electronic devices, by nature, travel along with a user. These devices are typically held in the user's hand while operating the device, then stored after use. Studies indicate several users, after using their devices, store their devices in a pocket of their clothing. In particular, the back pocket of their lower garment (e.g., a rear pocket of denim jeans). Due to the relatively small footprint of the device, the back pocket is a relatively simple means of storing the device. Studies further indicate that some of these users may sit down on, for example, a chair while the device is still in their pocket. Further, some of these users may remain seated for durations exceeding one minute.

However, this habit of leaving a device in the back pocket may be problematic. For example, the device may be subject to strain sufficient enough to temporarily disable the device, or even worse, permanently damage the device. A portion back pocket may exert a force a top portion and/or a bottom portion of the device in a first direction toward the user. At the same time, the user's posterior region may exert a force on a central portion of the device in a second direction opposite the first direction (that is, away from the user). These opposing strains on different portions of the device lead to increased strain on the device. This strain may cause damage to the enclosure and/or internal components of the device. Furthermore, next generation devices offering larger display screens which have an increased surface area vulnerable to strain.

SUMMARY

In one aspect, a system for determining a deformation of a portable electronic device is described. The system may include an enclosure that receives several components. The several components may include a detection device attached to the enclosure and a processor circuit electrically connected to the detection device. The processor circuit may activate an alert mechanism when the detection device enclosure is deformed.

In another aspect, a method of alerting a user that a portable electronic device is undergoing a deformation event is described. The method may include inserting a detection device in the portable electronic device. The method may also include generating an electronic signal from the detection device in response to an external strain on the portable electronic device. The method may also include transmitting an indication.

In another aspect, a portable electronic device having an alert mechanism configured to send an alert mechanism that the portable electronic device is deformed to at least a predetermined deformation. The portable electronic device may include a detection device and an enclosure capable of deforming from a first configuration to a second configuration. In some embodiments, when the enclosure is in the first configuration, the detection device transmits a first electronic signal. In some embodiments, when the enclosure is in the second configuration, the detection device transmits a second electronic signal. The second electronic signal may trigger the alert mechanism.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
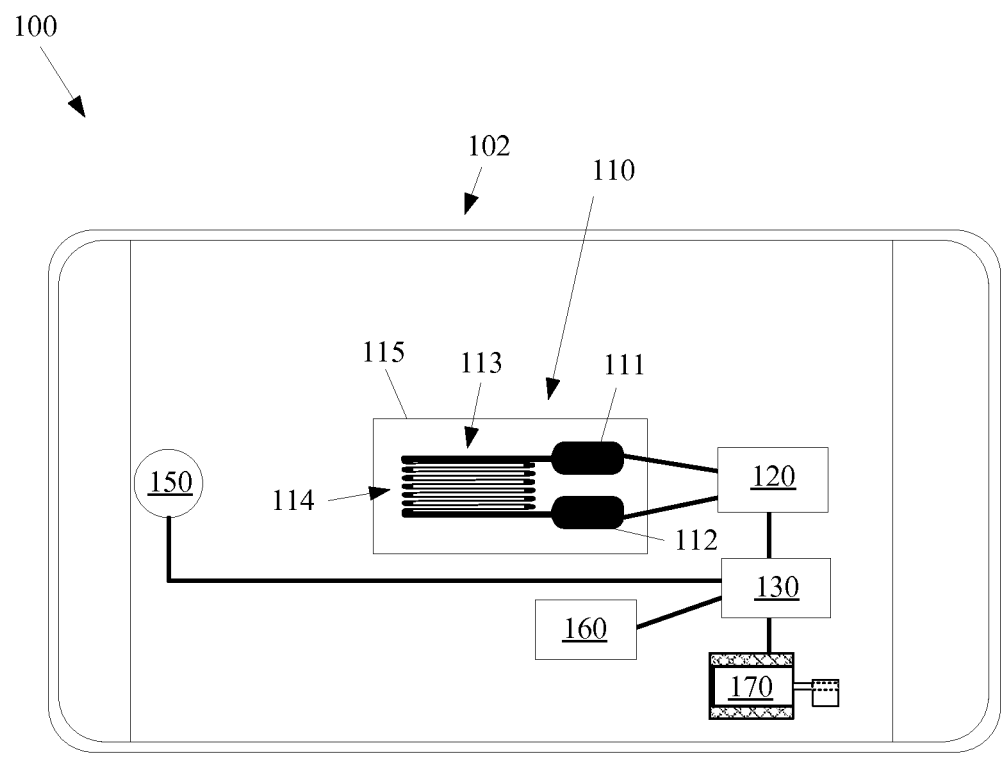
FIG. 1 shows a top view of an embodiment of a portable electronic device having an indication system used to alert a user of a deformation event.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a portable electronic device with an indication system to alert a user that a device is undergoing a strain that could impair or damage the device. In this detailed description, strain is defined as an external force on the device causing deformation of the device (e.g., enclosure, visual display). The indication system may include a detection device (e.g., strain gauge) which changes at least one property when the detection device undergoes strain. The detection device may be secured to an enclosure of the portable electronic device so that the detection device experiences a similar strain as that of the enclosure. The indication system may further include an alert mechanism for notifying a user (e.g, vibration, audible sound, text notification on a display) that the portable electronic device is experiencing strain. Upon notification of the alert mechanism, the user may take steps to remove strain from the portable electronic device. Removal of prolonged strain to the portable electronic device may prevent damage to the device.

The enclosure (or housing) of the device may be made of materials (e.g., plastic, aluminum) having a strength and/or thickness that cannot overcome relatively high strain on the enclosure. While sidewalls of the enclosure provide some resistance to strain, it may nonetheless be insufficient to prevent damage to, for example, an internal component of the portable electronic device, a display on the portable electronic device that provides visual content, and/or the enclosure itself. Also, the sidewalls may offer even less resistance to devices having increasingly larger displays. Rather than reinforce the enclosure with thicker material and/or more rigid material, an indication system described herein offers a warning to the user alerting the user to remove strain from the device.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates a top view of portable electronic device 100, or simply device 100, having an indication system configured to detect strain on an enclosure 102 of device 100. In some embodiments, device 100 is a portable computing device, such as a MacBook™ device from Apple, Inc., of Cupertino, Calif. In other embodiments, device 100 is a mobile communications device or a smartphone, such as an iPhone™ device, or a tablet computing device, such as an iPad™ device, both of which are from Apple, Inc., of Cupertino, Calif.

The indication system includes detection device 110 disposed on an inner portion of enclosure 102. As shown in FIG. 1, detection device 110 is a strain gauge. In other embodiments, detection device 110 is a device that changes at least one electrical property when the device undergoes strain. For example, in some embodiments, detection device 110 is configured to change a capacitance value when strain is applied. In other embodiments, detection device 110 is configured to change an inductance value when strain is employed. In the embodiment shown in FIG. 1, detection device 110 subjected to strain exhibits a change in electrical resistance.

Detection device 110 includes substrate 115. In some embodiments, substrate 115 is made of a material generally free of electrically conductive material that is also flexible. In other embodiments, substrate 115 is made of polyimide. Still, in other embodiments, substrate 115 is made of a semiconductor material. In the embodiment shown in FIG. 1, substrate 115 is made of silicon. In order for detection device 110 to detect strain on device 100, detection device 110 (in particular, substrate 115) should remain firmly secured or fastened to enclosure 102. This will be discussed in further detail below. Securing or fastening means includes adhesives, two-sided tape, or any material known in the art for securing a component to an enclosure of an electronic device.

Detection device 110 further includes first terminal 111 and second terminal 112, both of which are disposed on substrate 115. First terminal 111 and second terminal 112 are electrically connected to metal foil 113. First terminal 111, second terminal 112, and metal foil 113 are made of a material, or materials, generally known in the art for conducting electrical current (e.g., metal). In the embodiments where detection device 110 is a strain gauge, metal foil 113 includes a material or materials which exhibit some resistance to electrical current. As shown in FIG. 1, metal foil 113 is arranged in a grid pattern having several metal structures 114 passing back and forth. The grid pattern of metal foil 113 maximizes the amount of material that may be exposed to strain. This allows for improved sensitivity of detection device 110 to strain on device 100. Also, FIG. 1 shows metal structures 114 generally parallel to each other, but could be non-parallel in other embodiments.

FIG. 1 further illustrates metal foil 113 is disposed on substrate 115. In some embodiments, metal foil 113 is diffused onto substrate 115. In the embodiment shown in FIG. 1, metal foil 113 is adhesively attached to substrate 115. Adhesive means may include epoxy glue or cyanoacrylic glue, or two-side tape. Adhesive means may also serve as an insulator between metal foil 113 and substrate 115.

Also, in some embodiments, the grid pattern may include additional metal structures which may increases the sensitivity of detection device 110 to strain. This additional sensitivity may improve the ability of detection device 110 to determine lower levels of strain, which may be beneficial to device 100 having components that are relatively easy to damage due to strain. In other embodiments, the grid pattern may include less metal structures. This may allow a smaller form factor for detection device 110 such that detection device 110 that fits within relatively smaller electronic devices.

Figure 3:
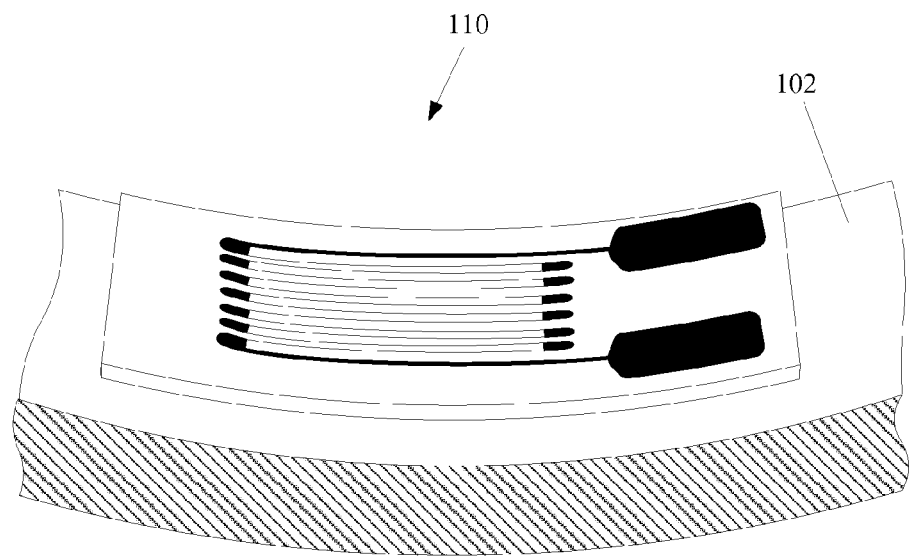
FIG. 3 shows an isometric view of the detection device in FIG. 2 positioned on an enclosure of a portable electronic device according to the described embodiments.

First terminal 111 and second terminal 112 are configured to receive an excitation voltage which passes through metal foil 113. An electrical resistance of metal foil 113 corresponds to the excitation voltage applied to detection device 110. Device 100 also includes meter device 120 electrically connected to detection device 110, and configured to measure electrical resistance from detection device 110. Electrical resistance is generally measured in micro-strains. In other embodiments, where capacitance or inductance is measured, meter device 120 measure capacitance or inductance, respectively. Also, in some embodiments, an internal power supply (not shown) within device 100 supplies the excitation voltage to detection device 110. In other embodiments, the internal power supply supplies the excitation voltage to detection device 110 via meter device 120. In the embodiment shown in FIG. 1, meter device 120 includes an internal power supply. When the excitation voltage is supplied to detection device 110, meter device 120 measures an initial electrical resistance. However, when detection device 110 is deformed (as shown in FIG. 3), or subjected to strain, the electrical resistance of detection device 110 changes, and meter device 120 measures an electrical resistance different from the initial electrical resistance. For example, the measured electrical resistance when strain is applied to detection device 110 may be higher than the initial electrical resistance.

FIG. 1 also shows device 100 having processor circuit 130 electrically connected to meter device 120. Processor circuit 130 is configured to read measurements from meter device 120. In other embodiments, processor circuit 130 is capable of measuring values from detection device 110. In this manner, an internal power supply may supply excitation voltage and meter device 120 may not be needed. Processor circuit 130 is configured to activate an alert mechanism when the electrical resistance changes. The alert mechanism may include an audio output from audio speaker 150, a vibration event from vibration motor 170, and/or a message on a display screen (not shown) of device 100 give a text-based warning that device 100 could become damaged due to prolong strain on device 100. Also, in some embodiments, the audio output is a pre-programmed audio file stored on memory circuit 160 of device 100. In other embodiments, the user may configure processor circuit 130 to play a particular audio file stored on memory circuit 160.

Processor circuit 130 may be configured to activate the alert mechanism to user only when a predetermined electrical resistance value is detected from detection device 110. The predetermined electrical resistance value prevents unnecessary alerts (e.g., false alarm), and allows device 100 to undergo some strain that will not cause damage to device 100. Also, when the user removes strain from device 100 such electrical resistance value from detection device 110 is below the predetermined electrical resistance value, processor circuit 130 terminates the alert mechanism. Also, it should be understood that in embodiments where detection devices 110 changes capacitance or inductance, processor circuit 130 is configured to read capacitance or inductance measurements, respectively, from meter device 120.

In some embodiments, memory circuit 160 stores indication events. In other words, memory circuit records when processor circuit 130 triggers an alert due to substantial deformation of device 100. In some embodiments, memory circuit 160 is also configured to transmit indication events, for example, to the visual display of device 100 or to an external electronic device (not shown) that is electrically connected to device 100. This information may be useful for several reasons. For example, the manufacturer can determine if the user subjected device 100 to substantial deformation which could void the warranty of device 100. Also, the information retrieved from memory circuit 160 may determine whether device 100 is sufficiently rigid or whether device 100 should be made of more rigid materials.

Figure 2:
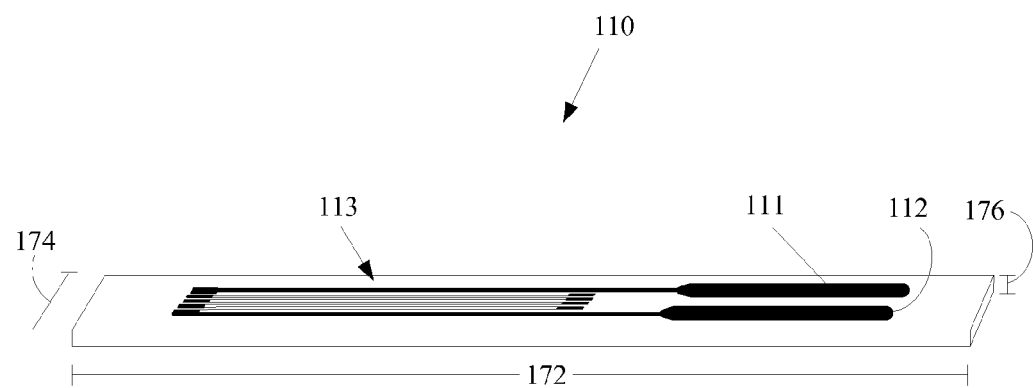
FIG. 2 shows an isometric view of an embodiment of a detection device.

FIG. 2 illustrates an isometric view of detection device 110 having length 172, width 174, and thickness 176. Length 172 and width 174 may be of any length and width such that the bottom portion (not shown) of detection device 110 is positioned on an inner surface of enclosure 102 (as shown in FIG. 1), and detection device 100 is a carrier for first terminal 111, second terminal 112, and metal foil 113. Because detection device 110 is configured to use minimal space in device 100, thickness 176 of substrate is relatively small. For example, thickness 176 may be approximately in the range of 15-50 microns. Also, while thickness 176 as shown in FIG. 2 is generally uniform, in other embodiments thickness 176 could vary in order to, for example, fit within a portable electronic device or receive a portion of first terminal 111, second terminal 112, and/or metal foil 113. Also, the thickness of first terminal 111, second terminal 112, and metal foil 113 is approximately in the range of 5 to 25 microns.

In order for detection device 110 to measure strain on enclosure 102, detection device 110 must be secured to enclosure 102. FIG. 3 shows detection device 110 secured to enclosure 102 (shown as a cross section) such that strain or deformation experienced by enclosure 102 is transferred directly to detection device 110. Also, electrical resistance values from detection device 110 are generally proportional to the amount of strain on detection device 110. In other words, electrical resistance of detection device 110 increases in a linear manner with increased strain on device 100. This allows processor circuit 130 (shown in FIG. 1) to determine with some precision when deformation of enclosure 102 should trigger an indication.

Figure 4:
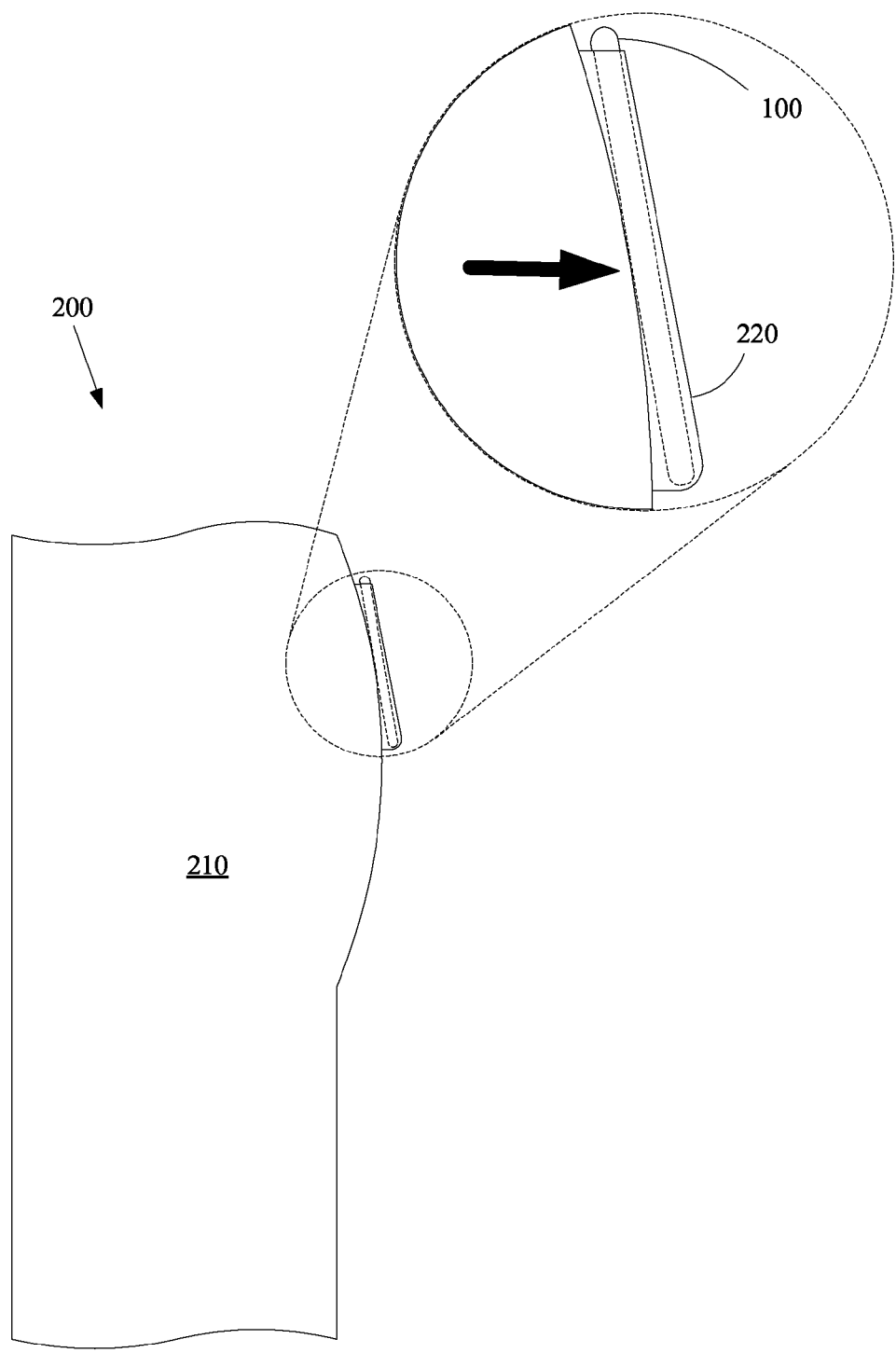
FIG. 4 shows an embodiment of a portable electronic device disposed within a user's back pocket of a lower garment.
Figure 5:
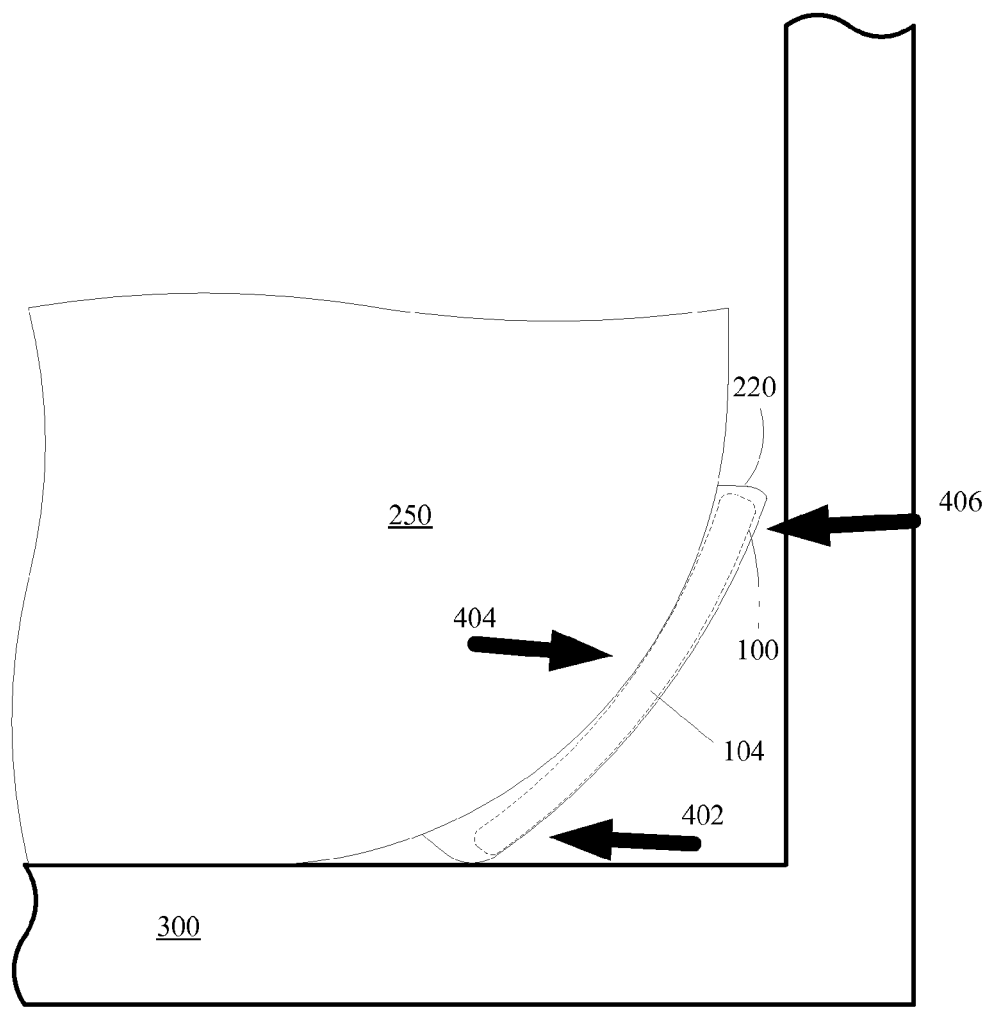
FIG. 5 shows the embodiment of the portable electronic device in FIG. 4, subject to strain by the user sitting down.

Several events may subject device 100 to deformation that could cause damage to device 100. For example, FIGS. 4 and 5 illustrate device 100 in a pocket 220 of garment 210. Device 100 includes a detection device (not shown) previously described. In FIG. 4, some strain by pocket 220 may deform device 100 when user 200 is standing. However, increased deformation may occur when a user is seated on chair 300 with device 100 still disposed within pocket 220, as shown in FIG. 5. For example, a bottom portion of pocket 220 may exert a first strain 402 in a direction toward a posterior portion 250 of user. Also, a central portion of pocket 220 may exert a second strain 404 in a direction generally opposite the direction of first strain 402, thereby further increasing overall strain on device 100. The opposing strains further increase the overall strain of device 100. Also, a top portion of pocket 220 may exert a third strain 406 on device 100 in a direction substantially similar to that of first strain 402. FIG. 5 shows the enclosure along with sidewall 104 of the enclosure deforming due to the various strains. Further, research has shown that when a user is seated and extends an arm (or arms), device 100 within pocket 220 is subject to even more strain. Because device 100 subjected to prolonged strain from first strain 402, second strain 404, third strain 406, or a combination thereof, may lead to damage, a detection device previously described is necessary to indicate to the user that the user to take action to remove strain from device 100 before damage occurs.

Other deformations events to device 100 may generate an alert mechanism. For example, a user may sit on device 100 when device is lying on chair 300. This may deform the visual display of device 100 when enclosure 102 is engaged with chair 300. Alternatively, enclosure 102 may be deformed when the visual display is engaged with chair 300. In some embodiments, an alert mechanism previously described may be generated when a visual display is deformed. Also, deformations events include placing external objects on device 100 that deform device 100 sufficiently enough to trigger an alert mechanism.

Research suggests that when a user places a portable electronic device in a rear pocket, the visual display is likely positioned proximate to the user's posterior region and the enclosure is positioned proximate to the rear pocket. In this manner, a portable electronic device having a detection device and enclosure will deform in a manner similar to detection device 110 and enclosure 102 shown in FIG. 3. However, a user may orient a portable electronic device in a different manner. For example, the visual display of the portable electronic device may be positioned proximate to the rear pocket. In this manner, a portable electronic device having a detection device and enclosure will generally deform in the opposite detection to device 110 and enclosure 102 shown in FIG. 3. At any rate, a detection device previously described may still be configured to change an electronic signal in a similar manner regardless of the deformation of the portable electronic device in order to indicate an alert or warning is needed. In other embodiments, a second detection device may be installed in a device to measure strain when the portable electronic device is deformed in a manner different that shown in FIG. 3.

Figure 6:
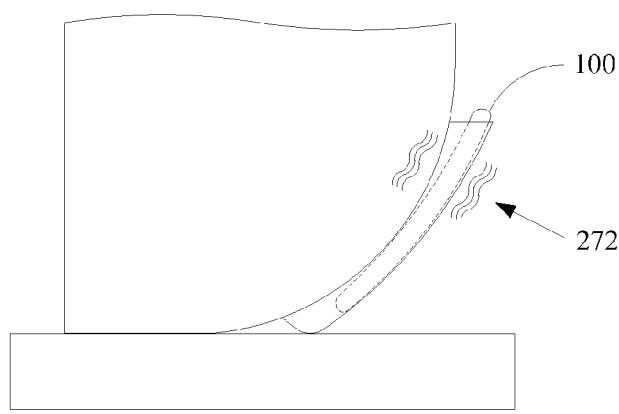
FIGS. 6-8 show various indications or alerts triggered when a deformation event occurs.
Figure 7:
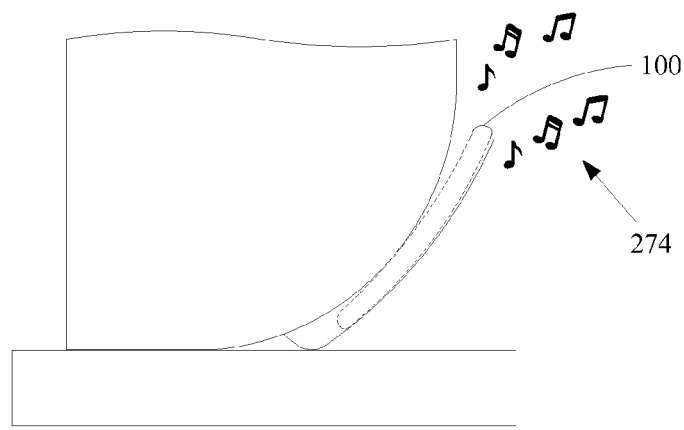
Figure 8:
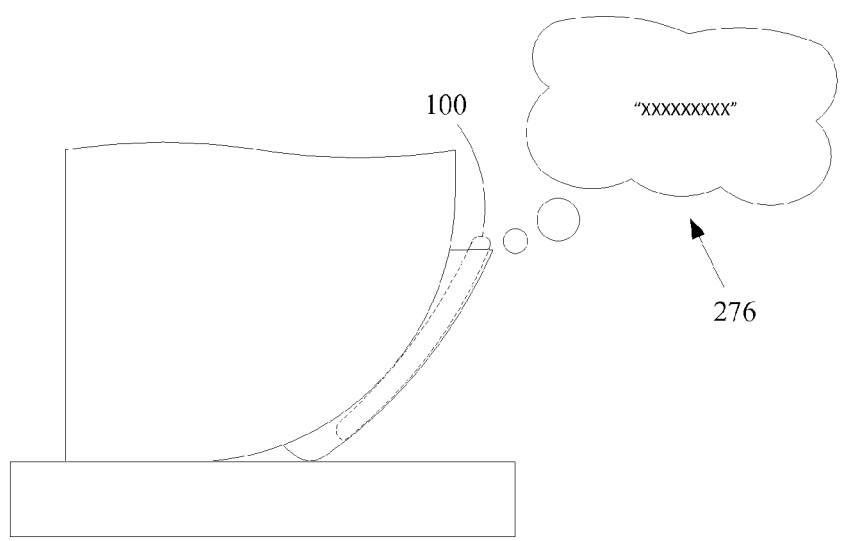

FIGS. 6-8 illustrate different embodiments of indications used to signal to the user that device 100 is undergoing strain. FIG. 6 shows vibration event 272 from a vibrational motor in device 100 triggered when the processor circuit reads an electronic signal (e.g., electrical resistance) above a predetermined value (e.g., from sufficient deformation of device 100). In FIG. 7, audible sound 274 is triggered in due to sufficient deformation. Audible sound 274 from an audio speaker within device 100 may be prerecorded audio file installed by the manufacturer of device 100. Audible sound 274 may also be an audio file, such as a song, selected by the user. In FIG. 8, the audible sound is a prerecorded message 276. The prerecorded message 276 may be created by the manufacture or the user.

Referring again to FIG. 1, detection device 110 is positioned generally in a central portion of enclosure 102. However, in other embodiments, detection device 100 may be positioned on enclosure 102 such that detection device 110 is proximate to components more susceptible to damage from strain. Still, in other embodiments, detection device 110 may include increased dimensions such that detection device 110 extends on a larger portion of enclosure 102 so that the detection device senses strain across a larger portion of enclosure 102. Still, in other embodiments, device 100 may include a plurality of detection devices. In this case, meter device 120 may be configured to measure electronic signals from the plurality of detection devices and transmit the electronic signals to processor circuit 130.

Figure 9:
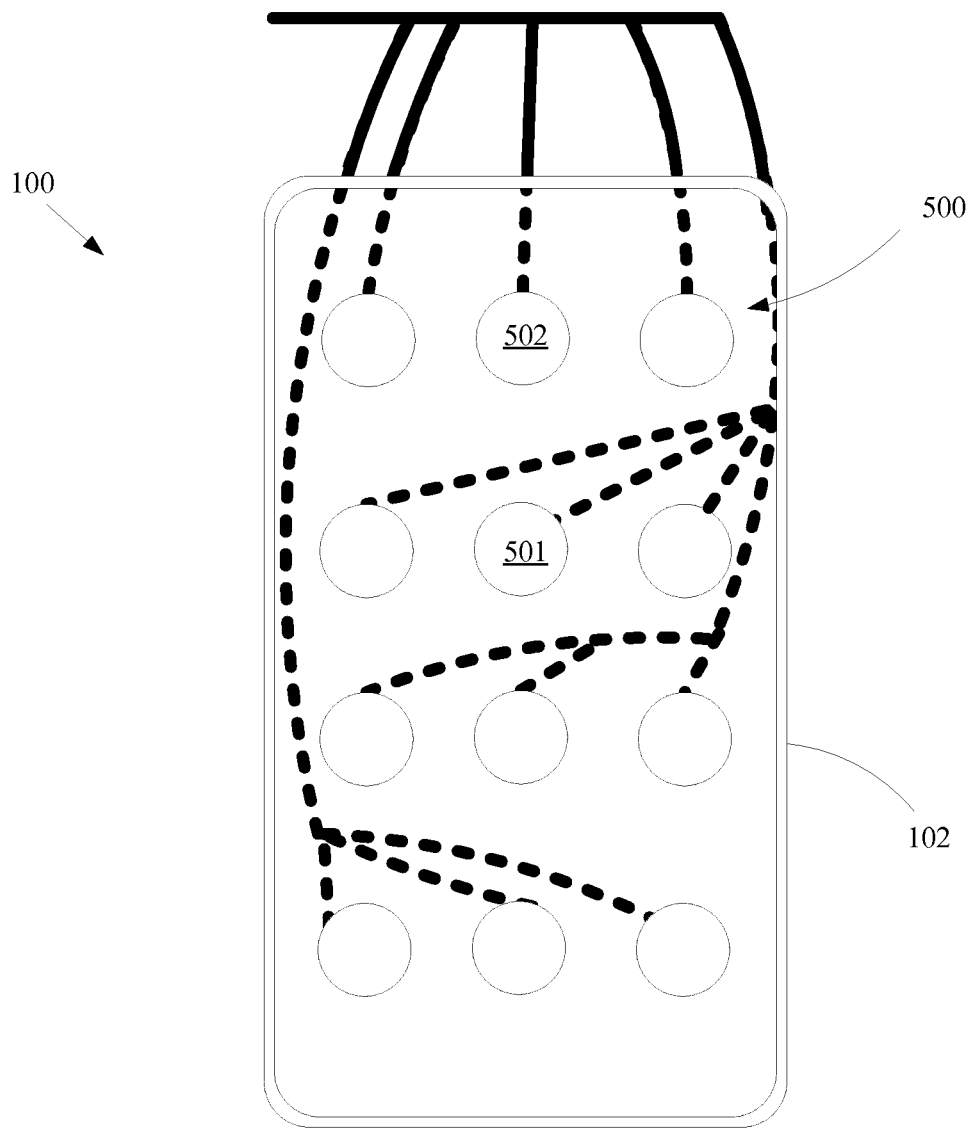
FIG. 9 shows an embodiment of a test apparatus having several load cells connected to a device.

Also, in order to determine strategic positions of the plurality of detection devices, a load test may be performed on device 100. FIG. 9 shows device 100 having several load cells 500 connected to device 100. Load cells 500 are electrically connected to a computing device (not shown) running a program to detect strain by the load cells 500. By subjecting device 100 to strain, load cells 500 may indicate specific portions of enclosure 102 that undergo strain. For example, first load cell 501 may undergo more strain than other load cells (such as second load cell 502), thereby indicating that detection device 110 should be positioned proximate to a position on enclosure 102 corresponding to the location of first load cell 501.

Also, other tests may be performed to model the structure of the enclosure. For example, finite element analysis ("FEA") may be used to calculate stress at certain portions the enclosure. A finite element analysis may model stress and/or displacement of portions of the enclosure. In this manner, it may be determined that certain portions (e.g., the top portion) of the enclosure are relatively weaker, and therefore more susceptible to strain than other portions (e.g., near the sidewall of the enclosure), thereby indicating a detection device is necessary in an area proximate to portions more susceptible to strain.

Figure 10:
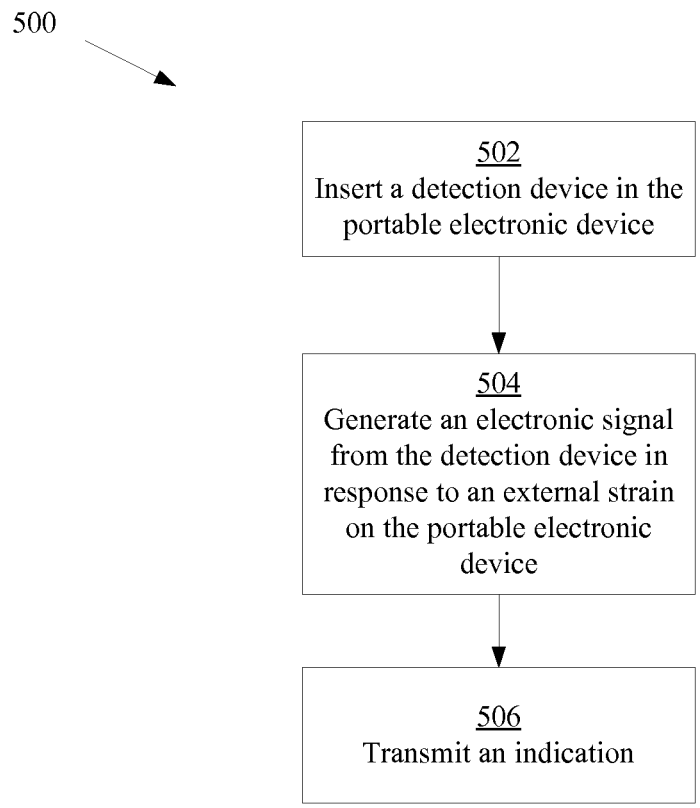
FIG. 10 shows a flowchart of a method of alerting a user that a portable electronic device is undergoing a deformation event in accordance with the described embodiments.

FIG. 10 is a flowchart 500 showing a method of alerting a user that a portable electronic device is undergoing a deformation event. In step 502, a detection device is inserted into the portable electronic device. In some embodiments, a bottom portion of the detection device is adhesively attached to an inner portion of an enclosure of the portable electronic device. In other embodiments, the detection device is positioned within at least a portion of the enclosure. For example, the enclosure may include a cavity that partially (or completely) receives the detection device. In step 504, an electronic signal is generated from the detection device in response to external strain on the portable electronic device. In some embodiments, the electronic signal is an electrical resistance value. In other embodiments, the electronic signal corresponds to a capacitance value. Still, in other embodiments, the electronic signal corresponds to an inductance value. The electronic signal may be detected by a meter device previously described. The meter device may be read by a processor circuit previously described. When the electronic signal reaches or exceeds a predetermined threshold, the processor circuit may trigger an indication. As shown in step 506, an indication is transmitted. The indication may be any type of indication previously described to alert the user that deformation to the device should be removed.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a metal enclosure having sidewalls and an interior surface;
a substrate mounted to the interior surface;
a meter device;
a detector attached to the substrate, wherein in response to a force that bends the metal enclosure, the detector is configured to bend with the metal enclosure and to generate an alert that the metal enclosure is in a bent configuration, the detector comprising:
first and second terminals attached to the substrate and electrically connected to the meter device; and
a metal foil arranged in a grid pattern and electrically connected between the first and second terminals, wherein the grid pattern comprises the metal foil folded in alternating directions; and
a display assembly mounted to the metal enclosure, wherein the detector is separated from the display assembly by an internal volume of the electronic device defined by the interior surface and the sidewalls.

2. The electronic device of claim 1, wherein the electronic device further comprises a plurality of output devices that generate the alert.

3. The electronic device of claim 2, wherein the meter device is configured to measure an electrical resistance of the metal foil.

4. The electronic device of claim 3, wherein the detector further comprises a processor circuit that compares the electrical resistance with a predetermined electrical resistance, wherein the processor circuits generates the alert when the electrical resistance is greater than the predetermined electrical resistance.

5. The electronic device of claim 4, wherein the substrate is positioned on a central portion of the metal enclosure to detect the bent configuration at the central portion.

6. The electronic device of claim 1, wherein the detector monitors the bent configuration when the display assembly is in an inactive state.

7. The electronic device of claim 1, wherein the detector generates the alert only when the metal enclosure is in the bent configuration regardless of a configuration of the display assembly.

8. The electronic device of claim 4, further comprising a memory circuit that records when the processor circuit has generated the alert.

9. An indication system for determining a bent configuration of an enclosure of an electronic device relative to an unbent configuration, the electronic device having a display with a first lateral area, the indication system comprising:
   a strain gauge that is mounted to the enclosure and that is configured to bend with the enclosure, wherein bending of the strain gauge generates a change in an electrical resistance value of the strain gauge, wherein the strain gauge has a second lateral area that is smaller than the first lateral area, wherein the strain gauge comprises a substrate coupled to the enclosure and a metal foil disposed on the substrate that exhibits the electrical resistance value, and wherein the electrical resistance value is greater in the bent configuration than in the unbent configuration; and
   a processor circuit that is configured to receive the electrical resistance value from the strain gauge and compare the electrical resistance value with a predetermined electrical resistance value, wherein when the electrical resistance value is greater than the predetermined electrical resistance value, the processor circuit generates a notification of the bent configuration.

10. The indication system of claim 9, wherein when the electrical resistance value is equal to the predetermined electrical resistance value, the processor circuit generates the notification.

11. The indication system of claim 9, wherein the notification comprises the electronic device playing a user-defined audio file.

12. The indication system of claim 9, wherein the predetermined electrical resistance value is associated with a predetermined deformation of the enclosure.

13. The indication system of claim 9, wherein the processor circuit generates the notification only when the enclosure is in the bent configuration.

14. A method for providing an alert that an enclosure of an electronic device is in a bent configuration relative to an unbent configuration, the electronic device having a processor circuit and a display screen with a first lateral area, the method comprising:
   using a strain gauge that is configured to bend with the enclosure to detect a change in electrical resistance when the enclosure is bent from the unbent configuration to the bent configuration, wherein the strain gauge has a smaller lateral area than the display screen, wherein the strain gauge comprises a substrate coupled to the enclosure and a metal foil disposed on the substrate that carries the electrical resistance, and wherein the electrical resistance is higher in the bent configuration than in the unbent configuration;
   receiving, at the processor circuit, the electrical resistance value from the strain gauge; and
   determining, by the processor circuit, whether the electrical resistance value is greater than a predetermined electrical resistance value to generate a notification of the bent configuration.

15. The method of claim 14, further comprising:
   in response to determining that the electrical resistance value is greater than the predetermined electrical resistance value, generating the notification of the bent configuration.

16. The method of claim 15, wherein generating the notification of the bent configuration comprises generating a vibration.

17. The method of claim 14, further comprising generating the notification based only on whether the enclosure is in the bent configuration.

18. The method of claim 14, wherein the predetermined electrical resistance value is associated with a predetermined deformation of the enclosure.

* * * * *